(12) United States Patent
Paranjpe et al.

(10) Patent No.: US 10,470,060 B1
(45) Date of Patent: Nov. 5, 2019

(54) NETWORK CONTROL AND OPTIMIZATION (NCO) SYSTEM AND METHOD

(71) Applicant: MARGO NETWORKS PVT. LTD., Mumbai (IN)

(72) Inventors: Rohit Paranjpe, Mumbai (IN); Ripunjay Bararia, Mumbai (IN); Devang Goradia, Mumbai (IN)

(73) Assignee: MARGO NETWORKS PRIVATE LIMITED, Mumbai (IN)

( * ) Notice: Subject to any disclaimer, the term of this patent is extended or adjusted under 35 U.S.C. 154(b) by 0 days.

(21) Appl. No.: 16/355,394

(22) Filed: Mar. 15, 2019

(30) Foreign Application Priority Data

Jan. 9, 2019 (IN) .............................. 201921000950
Jan. 9, 2019 (IN) .............................. 201921000982

(51) Int. Cl.
*H04W 24/02* (2009.01)
*H04W 24/08* (2009.01)
*H04B 17/318* (2015.01)
*H04W 84/12* (2009.01)

(52) U.S. Cl.
CPC .......... *H04W 24/02* (2013.01); *H04B 17/318* (2015.01); *H04W 24/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,307,956 B2 * | 12/2007 | Kaplan | H04L 12/5692 370/238 |
| 8,516,529 B2 | 8/2013 | Lajoie et al. | |
| 8,737,357 B2 | 5/2014 | Denny et al. | |
| 8,937,903 B2 | 1/2015 | Bari | |
| 9,001,682 B2 | 4/2015 | Kovvali et al. | |
| 9,173,158 B2 | 10/2015 | Varma | |
| 9,282,352 B2 | 3/2016 | McDysan et al. | |
| 9,374,619 B2 | 6/2016 | Andreasen et al. | |
| 9,419,845 B2 | 8/2016 | Wainner et al. | |
| 9,565,117 B2 | 2/2017 | Dahod et al. | |
| 9,674,239 B2 | 6/2017 | Wong et al. | |
| 10,045,070 B2 | 8/2018 | Markley et al. | |
| 10,097,503 B2 | 10/2018 | Bergman | |

(Continued)

FOREIGN PATENT DOCUMENTS

CN 103782571 5/2014
WO 2012131287 10/2012

(Continued)

OTHER PUBLICATIONS

Bhardwaj, Ketan et al., "AppFlux: Taming App Delivery Streaming," Georgia Institute of Technology, pp. 1-14.

(Continued)

*Primary Examiner* — Kevin D Mew
(74) *Attorney, Agent, or Firm* — DLA Piper LLP (US)

(57) ABSTRACT

A system and method for network control and optimization may be integrated into an application executed by a computing device so that the application and/or the user of the application can control the digital data network by which the application may access remote data. In one embodiment, the digital data network may include a cellular digital data network and a WiFi network.

24 Claims, 5 Drawing Sheets

(56) References Cited

U.S. PATENT DOCUMENTS

| | | | |
|---|---|---|---|
| 10,110,710 | B2 | 10/2018 | Cook et al. |
| 2007/0094691 | A1 | 4/2007 | Gazdzinski |
| 2008/0049630 | A1* | 2/2008 | Kozisek .............. H04L 41/0823 370/250 |
| 2010/0074267 | A1 | 3/2010 | Ladd |
| 2011/0314145 | A1* | 12/2011 | Raleigh .............. H04L 41/0893 709/224 |
| 2012/0166618 | A1 | 6/2012 | Dahod et al. |
| 2013/0107732 | A1 | 5/2013 | O'Donnell et al. |
| 2014/0094159 | A1* | 4/2014 | Raleigh ................ H04W 24/02 455/418 |
| 2014/0279047 | A1 | 9/2014 | Wang et al. |
| 2015/0237512 | A1* | 8/2015 | Chang .................. H04W 76/10 370/328 |
| 2015/0341705 | A1 | 11/2015 | Rauhe et al. |
| 2015/0350018 | A1* | 12/2015 | Hui ........................ H04L 47/11 370/254 |
| 2016/0337206 | A1 | 11/2016 | Bugenhagen et al. |
| 2018/0124143 | A1 | 5/2018 | Bologh |
| 2018/0124646 | A1* | 5/2018 | Thubert .................. H04W 4/70 |
| 2018/0184477 | A1 | 6/2018 | Paredes et al. |
| 2018/0310279 | A1* | 10/2018 | Pathak .................. H04W 16/02 |
| 2018/0317067 | A1* | 11/2018 | Ameixieira ............. H04W 4/46 |
| 2019/0141561 | A1* | 5/2019 | Altay ................ H04W 28/0205 |

FOREIGN PATENT DOCUMENTS

| | | |
|---|---|---|
| WO | 2015090360 | 6/2015 |
| WO | 2018027984 | 2/2018 |
| WO | 2018158729 | 9/2018 |

OTHER PUBLICATIONS

Kalva, Hari et al., "Techniques for Improving the Capacity of Video-on Dmand Systems," Proceeds of the 29th Annual Hawaii International Conference on System Sciences, (1996), 309-315.

Lai, Yuan-Cheng et al., "A Hierarchical Network Storage Architecture for Video-on-Demand Services," IEEE Transactions on Broadcasting, vol. 43:2, (Jun. 1997), 145-154.

Little, T.D.C. et al., "Prospects for Interactive Video-on-Demand," Multimedia Communications Laboratory, MCL Technical Report, (Feb. 15, 1994), pp. 1-22.

"How to Auto Switch between WiFi and Mobile the Smart Way," (Dec. 2018), 6 pp., Speedicyhttps://speedify.com/blog.

Kos, Tomislav et al., "CATV Broadband Technologies," EC-VIP-MC 2003, 4th EURASIP Conference, (2003), pp. 829-834.

Alloush, Alaa et al., "Initial use cases, scenarios and requirements," CogNet, (Nov. 30, 2015), Ver. 0.9, pp. 1-107.

Velasco, L. et al., "A Service-Oriented Hybrid Access Network and Cloud Architecture," (2015) pp. 8.

* cited by examiner

NETWORK CONTROL AND OPTIMIZATION (NCO) SYSTEM AND METHOD

PRIORITY CLAIMS/RELATED APPLICATIONS

This application claims priority under 35 USC 119 to Indian Patent Application No. 201921000950 filed Jan. 9, 2019, that entirety of which is incorporated herein by reference.

FIELD

The disclosure relates generally to a system and method for network control and optimization and in particular to a system and method for network control and optimization for a digital service provider (Developer of a Mobile App, Website, etc.) and to a consumer

BACKGROUND

The internet and the associated networks used by a consumer/consumer device to access a digital service as shown in FIG. 1 are well known. The internet allows different pieces of content/data required for a digital service to work to be delivered to a device, using a last mile network, like the smartphone shown in FIG. 1. The Internet shown in FIG. 1 is the combination of all physical units distributed across the globe that house all the information in the world. The internet data center is a series of distributed physical units that house all the networking and computing equipment, including redundant and backup components, infrastructure for power supply, data communications connections, environmental controls and various security devices. The CDN infrastructure is a geographically distributed network of servers that are housed in the Internet data center that serve most of the internet content today, especially web objects (text, graphics, scripts), downloadable objects (media files, software, documents), applications, live streaming media, on-demand streaming media and social media whose architecture is well known and whose operation is also known. The Internet, along with the Internet Data Center and the CDN Infrastructure is together termed as the Internet Infrastructure. A Digital Service Provider includes all individuals/companies/entities that use the Internet infrastructure to provide a service to consumers. The consumer Platform is/are mobile apps/websites/any interface through which a user accesses the service of a Digital Service Provider. The telecom Infra is an infrastructure setup by telecom companies that uses licensed wireless frequencies for access to the internet (2G/3G/4G/LTE—collectively, cellular data connections) and the Wi-Fi Infra is the infrastructure setup by Internet service providers to provide broadband/leased line connectivity to access internet or to which Access point's can be attached to access internet wirelessly using unlicensed frequency.

Using the conventional system shown in FIG. 1, the Service (Mobile App) shown in FIG. 1 works in the following manner. All information made available by a Digital Service Provider is stored/served either through server/s hosted by the Digital Service Provider or through a CDN. Based on data access patterns (what data is being consumed where), the CDN infrastructure caches certain data (a subset of all information) across multiple servers distributed across geographies. The CDN Edge servers (EDGE1, . . . , EDGEn in FIG. 1) are distributed globally and placed inside third party Internet Data Centers distributed globally and data centers operated by Internet Service Providers and Telecom service providers. When a consumer needs access to server/s hosted by the Digital Service Provider and the CDN (either via an Internet Service Provider or a Telecom service provider), the consumer needs to access the service over a "last mile" which is the data connection between the consumer (the smartphone device for example in FIG. 1) and the Internet Infrastructure. The experience of the consumer using the Service is dependent on the availability, the reliability and the throughput available on the last mile. More importantly, as the number of users and the data consumption per user increases, the load on the existing Internet Infrastructure, increases exponentially, affecting the experience of the user in densely concentrated areas.

Using a current convention system, accessing the service occurs in the following manner. An operating system (OS) of the smartphone of the consumer (see FIG. 1) detects the availability of connectivity over a cellular data connection (such as 4G/LTE as shown in FIG. 1) or Wi-Fi. If connectivity is available using only one module, the OS uses the available connectivity route. If both connectivity options are available, the OS detects which connection offers more stable and faster bandwidth availability and uses that connection to transact data packets, with priority assigned to Wi-Fi. If the above scenario changes at any point, the OS automatically shifts between the two, unless the user manually connects or disconnects from either of the two available options. From the perspective of the Service that the user is using, the Digital Service Provider or the user has no control over which connectivity route is used or when to switch from one to the other since that control and switching are device based, controlled by the OS running on the device.

Thus, existing systems have the technical problem that the data/service access over the last mile cannot be managed by a digital service provider based on the nature of the service and the amount of data that needs to be transacted or by the user who is experiencing the service and/or bearing the cost of last mile connectivity. Thus, it is desirable to be able to provide a technical solution that provides the digital service provider and the user with control over the connectivity route for the last mile and the ability to control the switching between the connectivity routes thus optimizing the consumer experience of the service being provided to the consumer and manage the cost borne by the consumer to access that service based on the consumer's preference.

DETAILED DESCRIPTION OF ONE OR MORE EMBODIMENTS

The disclosure is particularly applicable to a network control and optimization system (NCO) embedded or installed in a smartphone device or in a digital service as shown in the Figures for a content delivery system and method and it is in this context that the disclosure will be described. It will be appreciated, however, that the disclosed system and method has greater utility, such as to being implemented on various different computing devices that may be used to access a service from a digital service provider. In addition, the NCO may also be used to optimize the delivery of content or data from other systems (in addition to the exemplary digital service system) and can be used in any system in which it is desirable to optimize the consumer experience with a service. For purposes of this disclosure, the "service" provided to the consumer may be a piece of content (audio, visual and/or textual) or any piece of digital data being delivered to the consumer over any interface including a browser, a mobile application, a software application and the like.

Figure 1:
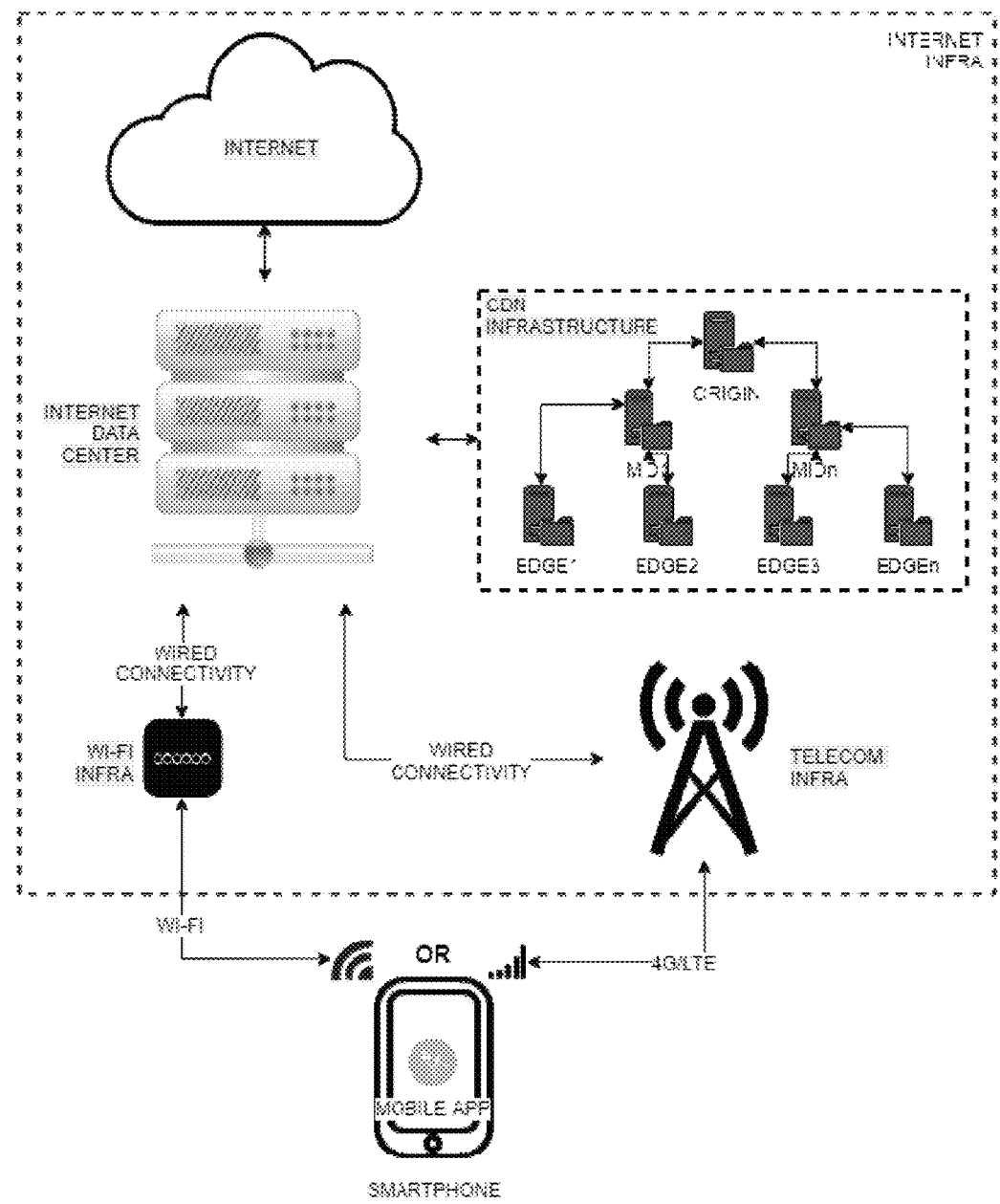
FIG. 1 illustrates a conventional content delivery network system.
Figure 2:
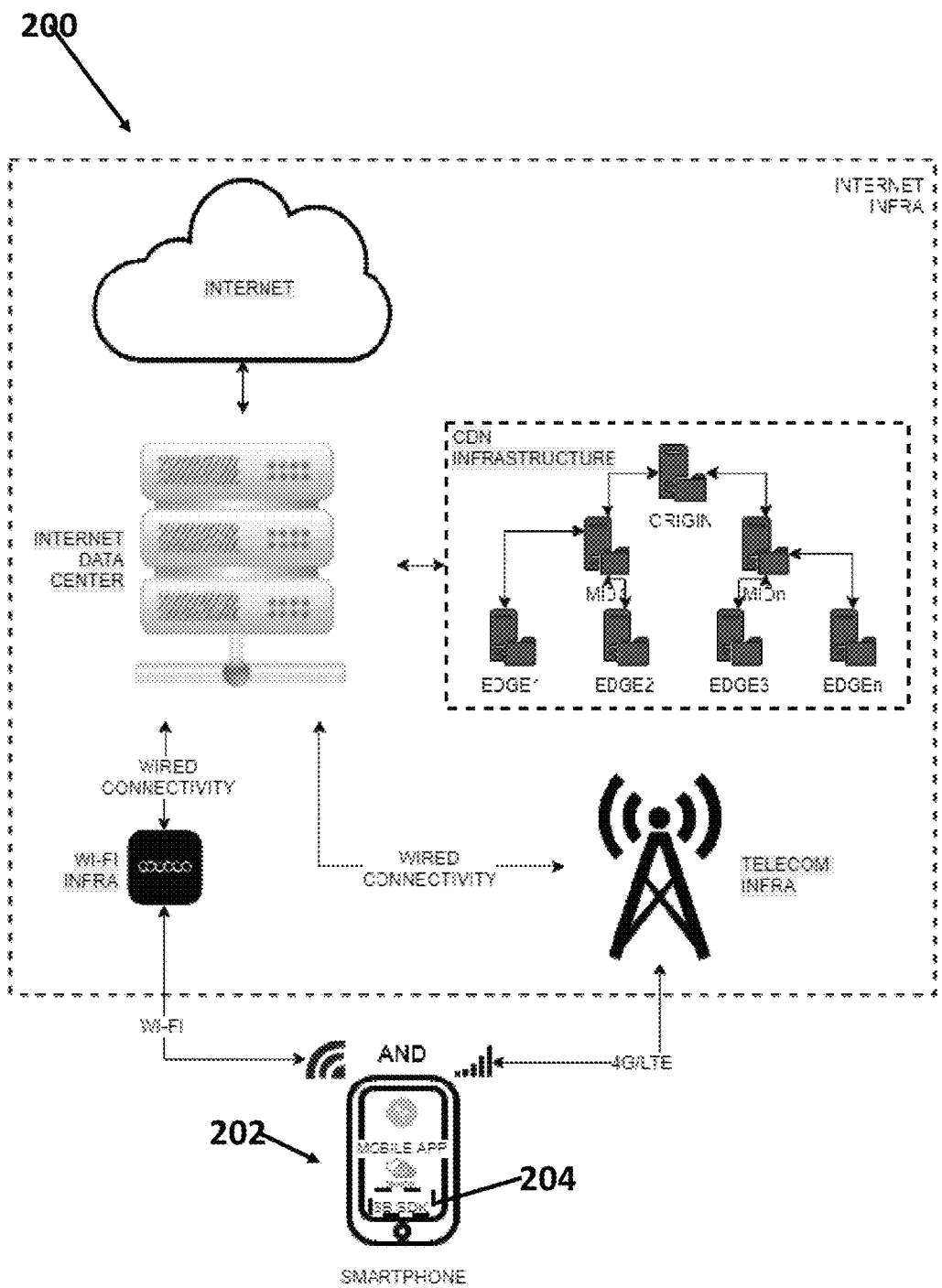
FIG. 2 illustrates a network control and optimization system (NCO) being used in a novel digital service system.

FIG. 2 illustrates a network control and optimization system (NCO) being used in a novel digital service system 200 wherein the internet infrastructure has the same elements as shown in FIG. 1 and operates in the same manner as described above. In the system 200, one or more computing devices 202 (including the smartphone device shown in FIG. 2) may use the last mile connection that permits each consumer to access and interact with the services being provided by a digital service provider using the internet infrastructure. For example, each computing device may be processor based device with memory, persistent memory, a display and connectivity circuits (including at a GSM module to connect to and access the cellular data network (4G/LTE for example) and a Wi-Fi module to connect to and access the Wi-Fi networks that each access the respective digital data network in a known manner using known protocols, Bluetooth, NFC, IR, or any other form of connectivity that may be used by a service) for connecting to and accessing data from the Internet Infrastructure. For example, each computing device 202 may be a smartphone device, such as an Apple iPhone device or an Android operating system based device, a personal computer, a tablet device, a laptop computer or a terminal device. Each computing device 202 may execute an application for interfacing with the Internet Infrastructure that may be, for example, a mobile application (mobile app) as shown in FIG. 2, a browser application or any other application.

Unlike the conventional system shown in FIG. 1, the system 200 may further include a NCO element 204 that may be embedded or installed on the computing device 202. Alternatively, the NCO element 204 may be part of the mobile application (such as an SDK as shown in FIG. 2) that is being used to connect to and access the digital data from the service of the digital service provider. Alternatively, the NCO element 204 may be integrated with each Service and/or a piece of configuration that is implemented at the network level for each network. The configuration at the network level ensures that the piece of code integrated in the Service can identify when the two networks are available simultaneously to a device (Wi-Fi and cellular data network), if the OS of the device doesn't allow the NCO to access either all or a part of the desired functionality required by the NCO and take decisions for utilizing one or the other based on specific data transfer requirements of the Service, characteristics of the network and preferences of the consumer.

The NCO element 204 may be implemented in a plurality of lines of instructions/computer code that are executed by the processor (or the central processing unit) of the computing device 202 so that the processor of the computing device 202 is configured to perform the NCO element processes and method described below. While the computing device 202 and its capability to connect to and interact with the digital service provider via the OS are known, routine and conventional, the computing device 202 having the NCO element 204 and the functions/operations of the NCO element 204 are atypical and not routine in the digital service industry and the computing device 202 having the NCO element 204 are a technical solution to the above described technical problem of current digital service systems and how data for a service is accessed.

Briefly, the NCO element 204 allows each digital service provider and/or the user of the service to control, for its different types of content and data as described below, how that data and content is accessed by each computing device (the technical solution) resulting in a better consumer experience of the service since the digital service provider can now customize network usage based on their data transfer requirement and the user can customize network usage based on attached cost of network usage. The NCO element 204 enables usage of Wi-Fi and cellular data connection simultaneously for a Service and enables the setting of a priority for Wi-Fi and/or cellular data connection for specific data requests made by a Service, when both networks are available simultaneously. The NCO element 204 may also enable setting a rule set to use only one type of network for specific data requests made by a Service and never use the other network for that type of data request. The NCO element 204 may also enable switching priority between Wi-Fi and cellular data network based on RSSI value of the network and/or available network throughput, when both networks are available simultaneously and may also enable switching priority between Wi-Fi and cellular data network based on the cost attached by the user to a network, when both networks are available simultaneously.

Figure 3:
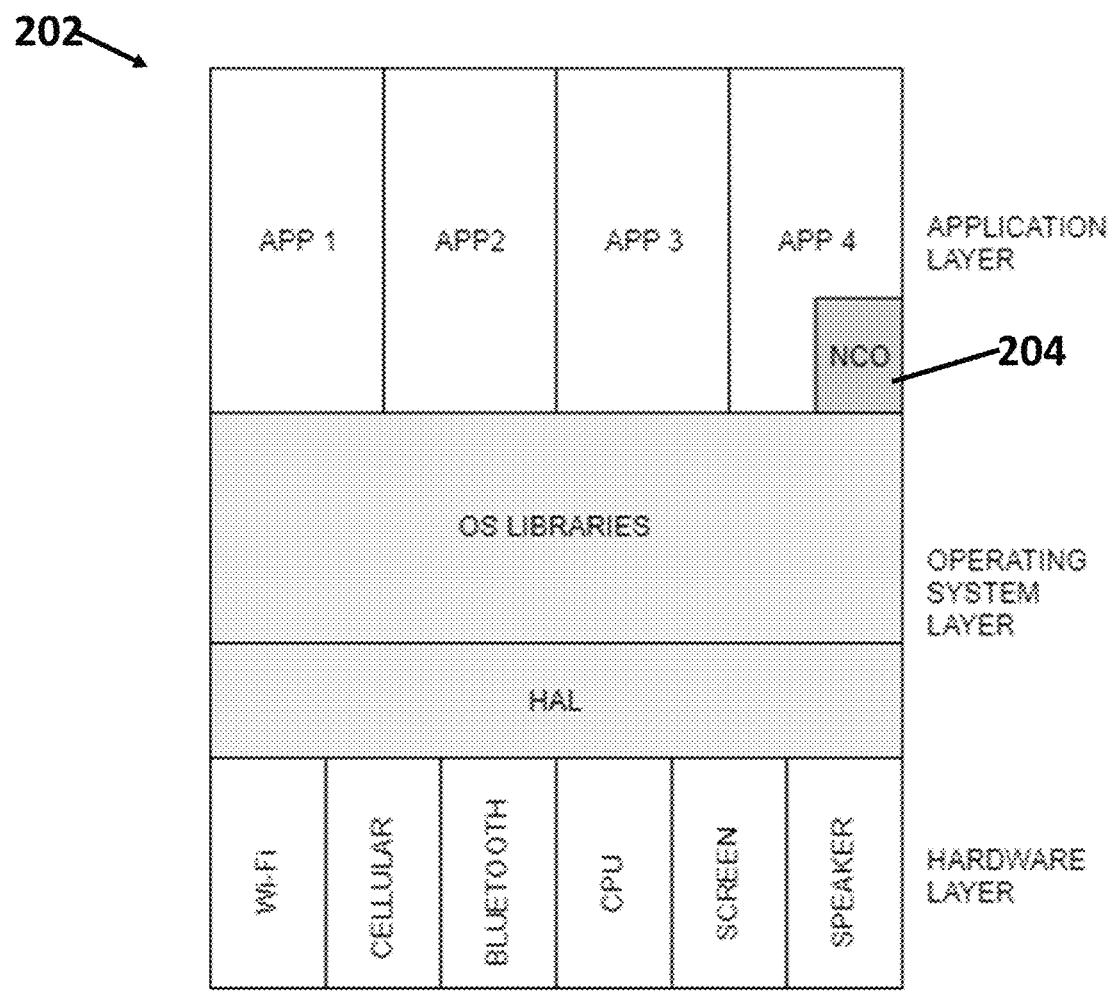
FIG. 3 illustrates an implementation of the NCO in a computing device that may be used as an interface between the novel digital service system and the device OS.

FIG. 3 illustrates an implementation of the NCO in a computing device 202 that may be used to retrieve different pieces of content from the novel digital service system. In the implementation shown in FIG. 3, the computing device 202 may have an application layer, an operating system (OS) layer and a hardware layer. The hardware layer may include the hardware elements and circuits of the computing device and may include the networking modules (Wi-Fi, Cellular Radio, Bluetooth, NFC, etc.) as well as the processor (CPU), screen and speaker and display and all other hardware components of the computing device. The OS layer may include known OS libraries and communicate to the hardware sub-system(s) using a Hardware Abstraction Layer (HAL). The application layer may include one or more applications (APP 1, . . . , APP 4 shown in FIG. 3) and each application utilizes the Operating libraries (OS Libraries) to provide different application functionalities and interacts with the actual hardware via the HAL. In one embodiment, the NCO element 204 is a piece of code integrated with a mobile application (APP 4) executed by the processor of the computing device and the NCO element 204 acts as an interface for network requests made by the application to the OS.

Figure 4:
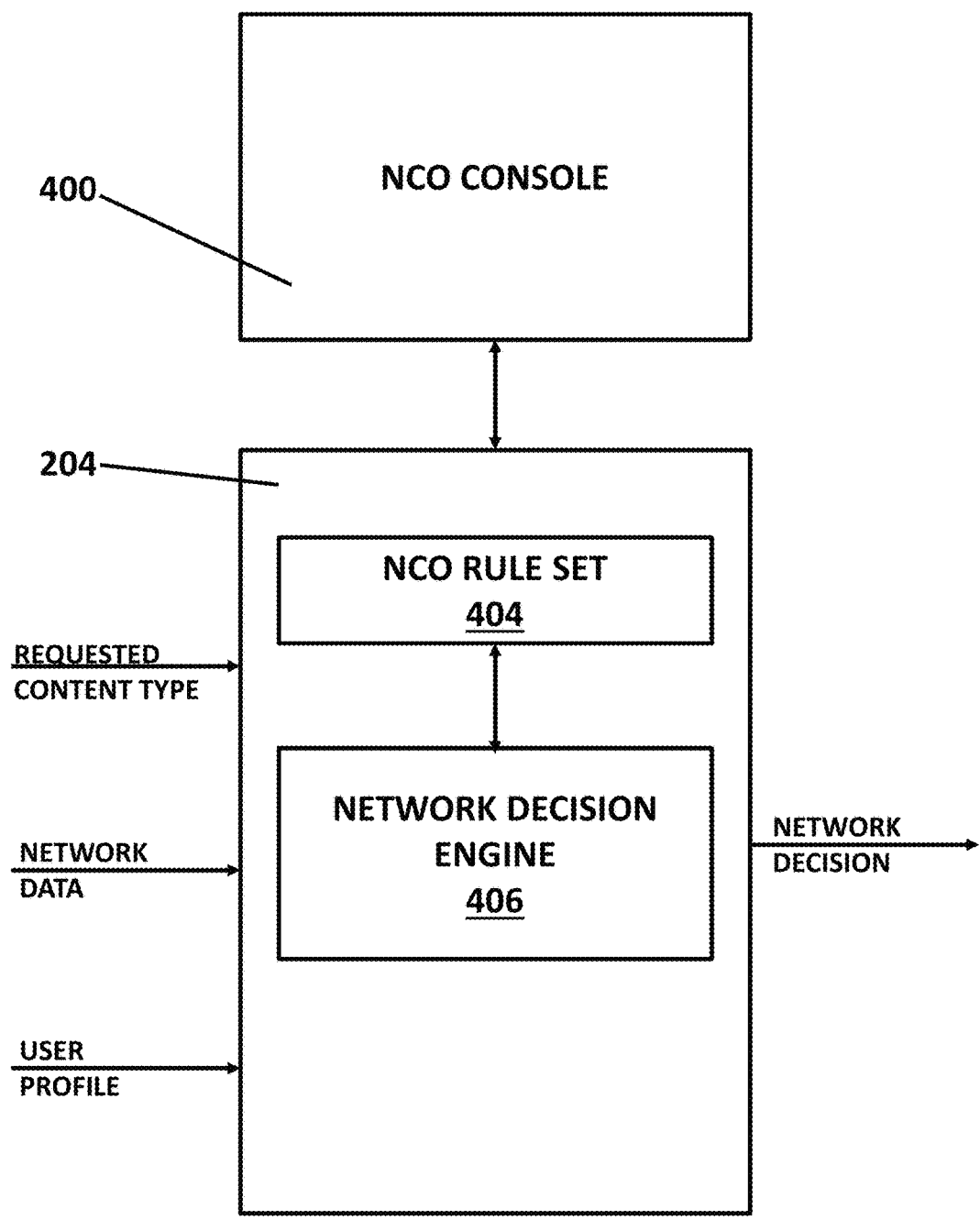
FIG. 4 illustrates more details of the NCO shown in FIGS. 2-3.

FIG. 4 illustrates more details of the NCO element 204 shown in FIGS. 2-3. In one embodiment, each application developer can customize their NCO element 204 based on a user profile as described below. In one implementation, the application developer may use a NCO console 400 (that may be located and executed on a processor remote from the NCO element 204, may be part of the NCO element 204 or may be a separate plurality of lines of computer code that reside within the NCO element 204) or may be a separate plurality of lines of computer code that reside within the digital service to configure/set a user profile (including an NCO rule set) that is used to determine a network decision (which network to select) for each network request.

The NCO element 204 may include the NCO rule set 404 (generated by the application developer as described above or a set of default rules) and a network decision engine 406 that uses the NCO rule set 404 and/or the preferences set by the user to generate a network decision for each network request. The NCO element 204 is therefore able to switch between the one or more available networks on the basis of the requested type of content as described below. The NCO element 204 may receive various input data that may be used, in combination with the NCO rule set, to generate the network decision output for each requested piece of content/data. For example, as shown in FIG. 4, the input data to the NCO element 204, for each network request may include: 1) information about the type of content/data requested; 2) information about each network and its availability to retrieve the requested content/data; and 3) the user profile if the set of rules are determined by the NCO element 204 itself. The NCO rule set 404 may be stored in a data structure/database, etc. in the NCO element 204 (on external to the NCO element 204). The network decision engine 406 may be implemented in hardware (if the NCO element 204 is implemented in hardware such as an FPGA, application specific integrated circuit, etc.) or software as a plurality of lines of computer code instructions executed by the processor of the computing device (when the NCO element 204 is implemented in hardware or software).

An example of the NCO rule set 404 that may be part of the NCO element 204 may be:

| Request Type | Preferred Network | Preferred Network Ruleset |
|---|---|---|
| Type 1 (API Requests) | 1. Wi-Fi 2. Cellular Data | If User Profile is: Experience: Always use the network with higher throughput to process all requests Cost: Use Wi-Fi as the first option, do not use cellular data if Wi-Fi is available Balanced/Default: Use the fastest connection first and fall-back to the other connection if needed |
| Type 2 (Content Requests) | 1. Wi-Fi (Only) | If User Profile is: Experience: Always use the network with higher throughput to process all requests Cost: Use Wi-Fi as the first option, do not use cellular data if Wi-Fi is available. If user has selected Zero cost setting, don't process request until a connection marked as Zero cost by the user is available. Balanced/Default: Use Wi-Fi as the first option. Don't use cellular data unless throughput on Wi-Fi falls below a predetermined level, such as 128 kbps for example, and available throughput on cellular is higher than a predetermined threshold, such as 128 kbps for example. Note that the particular thresholds can be modified by a developer or a user. Shift over to Wi-Fi again if the throughput on Wi-Fi becomes higher than cellular data or if the throughput on Wi-Fi becomes higher than 256 kbps |
| Type 3 (DRM Keys) | 1. Cellular Data 2. Wi-Fi | If User Profile is: Experience: Always use the network with higher throughput to process all requests Cost: Use Wi-Fi as the first option, do not use cellular data if Wi-Fi is available Balanced/Default: Use the fastest connection first and fall-back to the other connection if needed |
| Type 4 (Ad. Requests) | 1. Cellular Data 2. Wi-Fi | If User Profile is: Experience: Always use the network with higher throughput to process all requests Cost: Use Wi-Fi as the first option, do not use cellular data if Wi-Fi is available. If user has selected Zero cost setting, don't process request until a connection marked as Zero cost by the user is available. Balanced/Default: Use Wi-Fi as the first option. Don't use cellular data unless throughput on Wi-Fi falls below 128 kbps and available throughput on cellular is higher than 128 kbps. Shift over to Wi-Fi again if the throughput on Wi-Fi becomes higher than cellular data or if the throughput on Wi-Fi becomes higher than 256 kbps |

In addition to the rule set that may be generated by the application developer as described above, the App developer can also expose preferences/settings to the user of the computing device that allow the user to customize the experience for the user. For example, the user can select between optimizing speed of delivery or optimizing cost. Using this setting, the user can select one of the following preferences:

1. Do not use the cellular data connection no matter what
2. Use the cellular data connection for small requests
3. Use the cellular data connection for all requests The user can also assign a cost to each network that the user is connected to, which the NCO element 204 can factor to make each network decision.

1. User can define the cost of a network on as "High", "Low", or "Unmetered" or on a scale of 1 to 10, where 1 being the lowest and 10 being the highest
2. Unmetered means that the network has no cost attached to it, use this network the most, Low cost means, use this network when an unmetered network is not available, Higher cost means use this network the least
3. Once a network has a cost value associated with it, the NCO element 204, rule set can also utilize the cost of the network to take a decision and route the delivery of requests over one or the other network interface
   Example:
      1. User connects to Wi-Fi, and assigns a cost of "5" to this network
      2. The cellular data connection has a default cost of "10", this being the most expensive network that you have
      3. In this scenario the NCO rule-set will make the decision to use the Wi-Fi network as the primary network, while monitoring the throughput of the Wi-Fi network.
      4. If the throughput of the Wi-Fi network drops at some point, it will switch over to using the cellular data connection which has a higher cost associated with it.

In a preferred embodiment, the NCO element 204 may use the following functionalities from an Operating System of the computing device:

1. The Operating system should keep all the interfaces for each of the networks (collectively, the "interfaces") active as requested by the NCO element.
2. For every request to get resources from the network, the Operating system should allow the NCO element to choose the source interface from the list of available and connected interfaces.
3. The Operating system should provide the ability to measure the throughput of each network interface on an on-demand basis (part of the network data used by the NCO element 204 to determine the network decision).
4. The Operating system should provide the Received Signal Strength Indication on an on-demand basis for each network (again part of the network data used by the NCO element 204 to determine the network decision).
5. The Operating system should allow for attaching a cost to data transfer on every network interface to enable cost optimizations for data transfer.
6. Operating system should honor the classless static routes to allow the serving of network requests from a purely local environment.

Using the above functionalities from an Operating system, the NCO element 204 enables a Service to do the following:
1. Set the source interface for each request made by the Service
2. Define a rule set for switching the source interface based on RSSI, throughput and honouring the user's preferences on cost.

Figure 5:
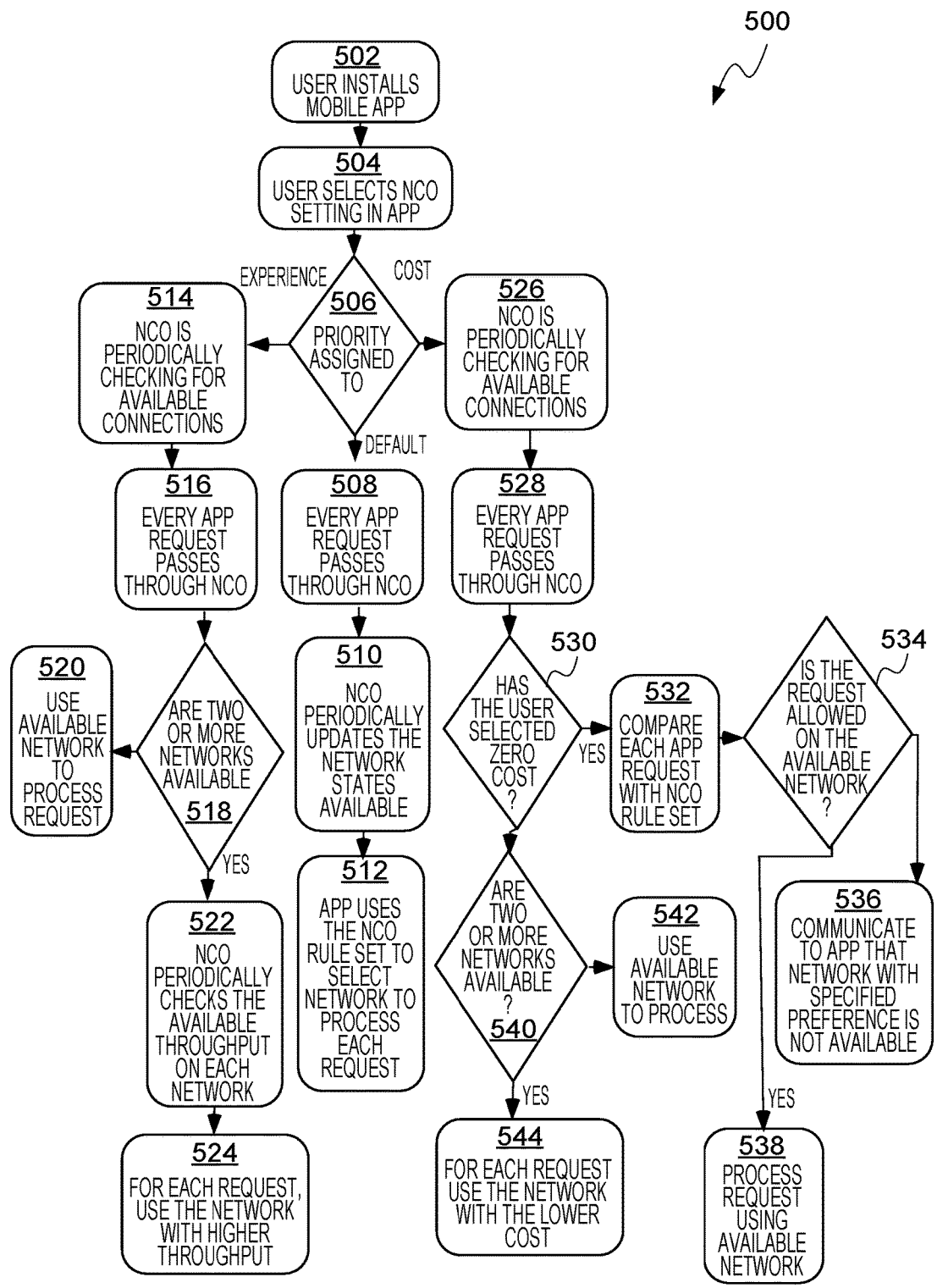
FIG. 5 illustrates a method for using the computing device with NCO in the novel digital service system.

FIG. 5 illustrates a method 500 for using the computing device with an NCO element in the novel digital service system in which the NCO element is implemented as a plurality of lines of instructions being executed by the processor of the computing device. The user may install a mobile app (502) onto the computing device and the mobile app has the NCO functionality embedded into the mobile app in this example. The user may then select the NCO setting in the app (504) to activate the NCO processes and functionality as described above. Thus, the user may use the mobile app without the NCO processes and the mobile app operates as normal. Once the user activates the NCO processes, the NCO determines if the user, for network requests from the service, assign priority to cost of retrieval or user experience (506) based on the user profile for the particular user associated with the NCO.

The NCO may have a default mode (if there is no user profile for the particular user for example or the user profile does not include an assigned priority) and then each network request made by the service may be input to the NCO (508) that in turn makes the network decision for each request. In the default mode, the NCO may periodically update the status/state of each available network (510) that is one of the inputs to the network decision engine as described above. For each app request, the NCO in the default mode uses the NCO rule set (that may be a default NCO rule set) to process each app request (512).

If user experience is assigned priority for the particular user, the NCO may periodically check for available network interfaces/connections (514) and each network request may be processed by the NCO (516). The NCO may determine if two or more networks are available simultaneously (518), but will use the available network (520) if only one network is available at the time of a particular app request. If there are multiple networks available, the NCO may periodically check the available throughput for each network (522) and then, for each request, select the network that has the higher throughput (524) since that network should provide the better user experience.

If cost is assigned priority for the particular user, the NCO may periodically check for available network interfaces/connections (526) and each app request may be processed by the NCO (528). The NCO may then determine if the user has selected zero cost (530). If the user has selected zero cost, the NCO may compare each app request with the NCO rule set (532), determine if the particular app request is allowed on the available network (534) and communicate to the app that the network with the specified network preference is not available (536) if the particular app request is not allowed.
1. An application is requesting to stream a video when the only available network to the device is LTE and this type of request is not allowed as per the NCO rule set and set user preferences.
2. The request will not be processed and the NCO will communicate the same to the service to show a prompt to the user informing the user of the same and allow the user to make an informed exception, if the user so chooses.

If the particular app request is allowed, then the request is performed using the network (538). If the user has not selected the zero cost setting, then the NCO determines if two or more networks are available (540) and use the available network (542) if only one network is available. If two or more networks are available, then the NCO may select the network with the lower cost (544). For example, the NCO may use the free WiFi network instead of a cellular digital data plan.
3. User has selected Experience:
    a. Experience setting overrides all other parameters of the NCO and prioritizes the throughput of the network connection and uses the connection with the highest throughput to deliver the content to the application/user
    b. The NCO will continuously measure the network throughput of all connections available and mark the best one out as the preferred connection for all types of network requests
4. User has selected Zero Cost
    a. The NCO will determine if a network with Zero cost is available. If yes, that will be marked as the preferred network.
    b. If no network with zero cost is available, the lowest cost network will be marked by the NCO as the preferred network.

Below is a more specific example of how the NCO embedded in a mobile app, such as a video streaming app like Netflix, may operate. In this example, the application relies on a data connection (Wi-Fi or cellular data network) for the following 6 types of information/requests:
1. API requests—The app requires access to the internet for multiple different forms of API requests like:
    a. Content list to be displayed on each page
    b. Authentication and subscription information about a user
    c. User personalization information including user preferences, watchlists, watch history, favourites and user specific recommendations
2. Content—The app requires access to the internet to fetch content including images, audio, video and associated meta-data including subtitles, etc.
3. DRM Key—The app requires access to the internet to fetch DRM keys to decrypt content on the user device
4. Advertisements—The app requires access to the internet to send out ad tags to the ad server and to fetch relevant advertisements based on the ad tags
5. Analytics—The app requires access to the internet to transfer information regarding app performance, usage, user actions, ad impressions, ad interactions/click throughs, etc. to the analytics server or integrated third party analytics platforms
6. Payment—The app requires access to the internet to facilitate payments using integrated payment gateways to provide a user access to premium content Using the NCO and the method described above, the NCO can define the following:
1. In an event that both Wi-Fi and cellular data network are available simultaneously to the mobile application
    a. For API requests, requests for DRM keys, requests for ad tags, analytics requests and payment requests, set Cellular Data Network as Priority 1 and Wi-Fi as Priority 2. The reason for this is that all of these requests are very light (between few Bytes and few KB)
    b. For all content requests and delivery of advertisements, set Wi-Fi as Priority 1 and cellular data network as Priority 2. The reason for this is that these requests are heavy (between a few MB and a few GB)
    c. In an event that the Wi-Fi RSSI goes below a preset level, such as −85 dbm for example, don't use Wi-Fi as the default network for any request
2. Offer a setting to the user to choose priority between Experience, Balance and Expense.
    a. In an event wherein, the user chooses Expense, the app will use Wi-Fi as Priority 1 for all requests. For all data light requests, cellular data network will be set as Priority 2 and for all data heavy requests, there will be no priority set for the cellular data network (Only Wi-Fi to be used to process all heavy requests). So, when there is no Wi-Fi present, the mobile app will process all light requests to show user the available content, recommendations and other features, but will not stream or download any content or display any ads. This functionality will only be active when a Wi-Fi network is available to the user.
    b. In an event wherein the user chooses Balance or doesn't choose any setting, the mobile app will use Wi-Fi as Priority 1 and cellular data network as Priority 2 for all heavy requests and use cellular data network as Priority 1 and Wi-Fi as Priority 2 for all light requests
    c. In an event wherein the user chooses Experience, the SugarBox NCO will periodically detect which out of the two networks has higher throughput and assign Priority 1 to that network for all requests In view of the above disclosure, the NCO processes described above are a technical solution (the overall combination of processes executed by the computing device and not the routine computing device) to a technical problem of the accessibility of a network requests by a service. In one aspect, the disclosed technical solution allows the app (with an embedded NCO) to control and effectively manage the request process instead of the known systems in which the Operating System of the computing device may select a network as described above.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, OS library/ies, firmware, etc. found in general-purpose computers. In implementations where the innovations reside on a server, such a server may include or involve components such as software modules, OS library/ies, firmware, such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost. In addition to the implementations described above in which the settings/rules, code and configuration are implemented in the NCO in the application, the settings/rules, code and configuration may be implemented at the network level is network level elements that perform the same processes as described above.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. An apparatus, comprising:
   a processor;
   a memory;
   a plurality of network hardware interfaces, the plurality of network hardware interfaces including a GSM interface and a Wi-Fi interface;
   an application comprising a plurality of lines of instructions including a network control and optimization element, the network control and optimization element executed by the processor so that the processor is configured to:
      keep all network interfaces active when so instructed by the application;
      provide the received signal strength indication and throughput of each network interface when so instructed by the application;
      provide network details for each connected network from each network interface to the application;

honour the classless static routes to allow the serving of network requests from a purely local environment;

receive inputs for a plurality of requests from the application;

select a rule, based on the received inputs, from a rule set, the selected rule making a decision about one or more networks to be used to access some or all of the requests from the application; and determine, using the selected rule, the network hardware interface to use for some or all application requests.

2. The apparatus of claim 1, wherein the processor is further configured to determine to use one of a cellular digital data network or a Wi-Fi network for each application request or both a cellular digital data network and a Wi-Fi network simultaneously for two different application requests based on the type of request.

3. The apparatus of claim 1, wherein the processor is further configured to store the rule set, the rule set having a plurality of rules which determine a network to use for each application request.

4. The apparatus of claim 3, wherein one of a network throughput and a Received Signal Strength Indicator can be set to determine which network to use for each application request.

5. The apparatus of claim 4, wherein the inputs further comprise a user profile or user setting that assigns a priority for determining which network interface to use for each application request.

6. The apparatus of claim 5, wherein the priority is selected from one of cost, user experience and default.

7. The apparatus of claim 6, wherein the user can assign a cost to each network that the processor connects to.

8. The apparatus of claim 7, wherein the user can set a Zero Cost preference that provides limited application functionality when the processor is connected to a network with attached cost and full application functionality only when the user is connected to a Zero Cost network.

9. A method for accessing digital data, comprising:

providing an application including a network control and optimization element, the network control and optimization element executed by a processor of a computing device;

keeping all network interfaces active when so instructed by the application;

providing the received signal strength indication and throughput of each network interface when so instructed by the application;

providing network details for each connected network from each network interface to the application;

honouring the classless static routes to allow the serving of network requests from a purely local environment;

receiving, by the network control and optimization element, a plurality of inputs associated with a plurality of network requests from the application;

selecting, based on the plurality of received inputs, a rule from a rule set, the selected rule making a decision about one or more networks to be used to access some or all of the requests from the application; and determining, by the network control and optimization element using the selected rule, a network hardware interface to access some of all of the requests from the application.

10. The method of claim 9, wherein determining the network hardware interface for each application request further comprises determining to use one of a cellular digital data network or a Wi-Fi network for each application request or both a cellular digital data network and a Wi-Fi network simultaneously for two different application requests based on the type of request.

11. The method of claim 9 further comprising storing the rule set, the rule set having a plurality of rules which determine a network to use for each application request.

12. The method of claim 11 further comprising setting one of a network throughput and a Received Signal Strength Indicator to determine which network to use for each application request.

13. The method of claim 11, wherein the inputs further comprise a user profile or user setting that assigns a priority for determining which network interface to use for each application request.

14. The method of claim 13, wherein the priority is selected from one of cost, user experience and default.

15. The method of claim 13, wherein the user can assign a cost to each network that the processor connects to.

16. The method of claim 15 further comprising setting, by a user, a Zero Cost preference that provides limited application functionality when the processor is connected to a network with attached cost and full application functionality only when the user is connected to a Zero Cost network.

17. A data delivery system, comprising:

a digital service system that stores data accessing over a plurality of networks that are part of the internet infrastructure and local/private networks that are outside the purview of the internet infrastructure;

a computing device having a processor, a memory, a plurality of network hardware interfaces, the plurality of network hardware interfaces including a cellular digital data interface and a WiFi interface to each access the internet and intranet infrastructure and an application comprising a plurality of lines of instructions including a network control and optimization element;

the network control and optimization element executed by the processor of the computing device so that the processor is configured to:

keep all network interfaces active when so instructed by the application provide the Received Signal Strength Indication and throughput of each network interface when so instructed by the application provide network details for each connected network from each network interface to the application honour the classless static routes to allow the serving of network requests from a purely local environment receive inputs for a plurality of requests from the application;

select a rule, based on the received inputs, from a rule set, the selected rule making a decision about one or more networks to be used to access some or all of the requests from the application; and determine, using the selected rule, the network hardware interface to use for some or all of the application requests.

18. The system of claim 17, wherein the processor is further configured to determine to use one of a cellular digital data network or a Wi-Fi network for each application request or both a cellular digital data network and a Wi-Fi network simultaneously for two different application requests based on the type of request.

19. The system of claim 17, wherein the processor is further configured to store the rule set, the rule set having a plurality of rules which determine a network to use for each application request.

20. The system of claim 19, wherein one of a network throughput and a Received Signal Strength Indicator can be set to determine which network to use for each application request.

21. The system of claim 19, wherein the inputs further comprise a user profile or user setting that assigns a priority for determining which network interface to use for each application request.

22. The system of claim 21, wherein the priority is selected from one of cost, user experience and default.

23. The apparatus of claim 22, wherein the user can assign a cost to each network that the processor connects to.

24. The apparatus of claim 23, wherein the user can set a Zero Cost preference that provides limited application functionality when the processor is connected to a network with attached cost and full application functionality only when the user is connected to a Zero Cost network.

\* \* \* \* \*